Jan. 6, 1959  J. MOULLEC  2,867,218
THRESHER HAVING ANGULARLY ADJUSTABLE CONCAVE
Filed Feb. 17, 1955  4 Sheets-Sheet 4
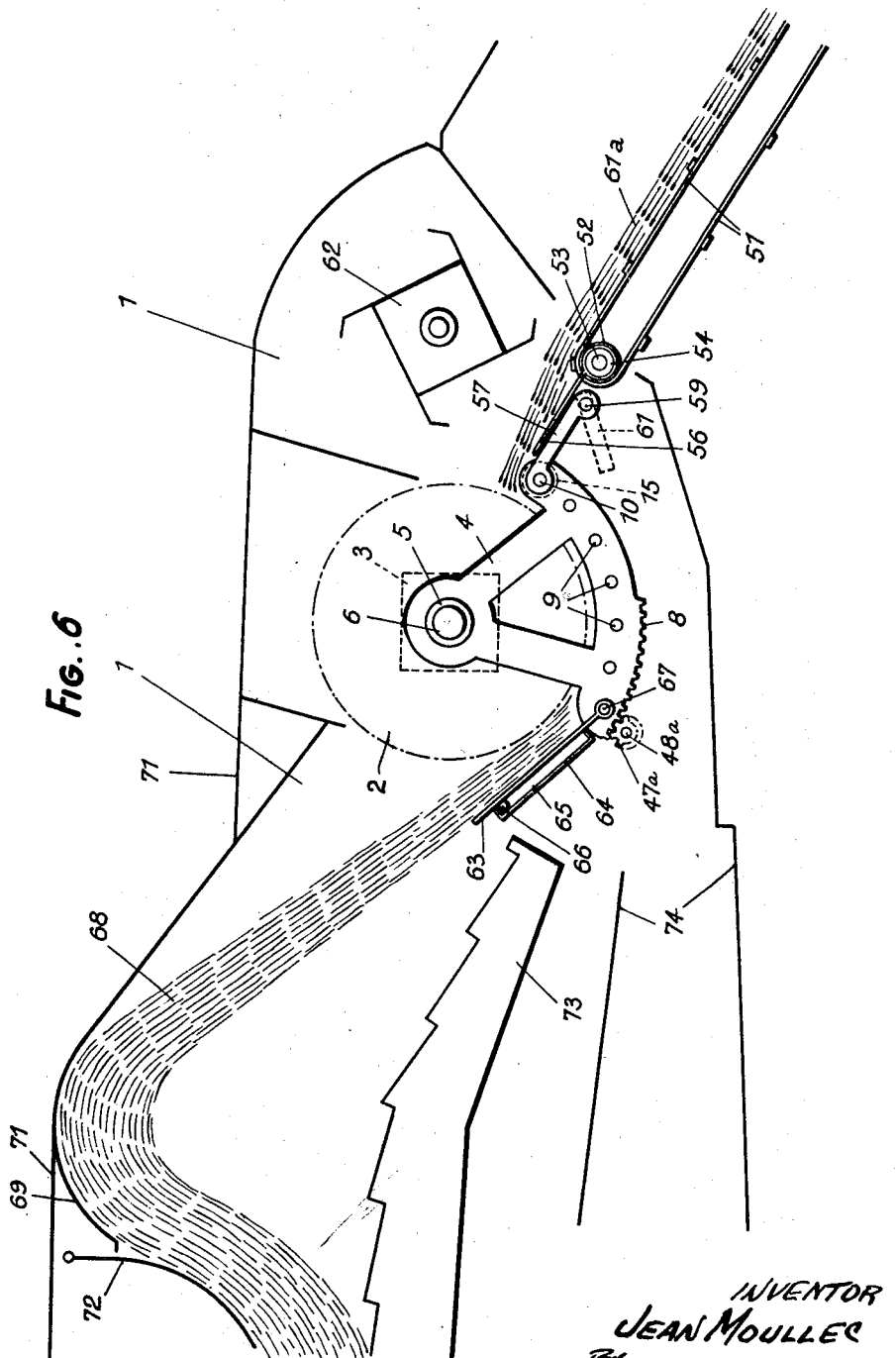

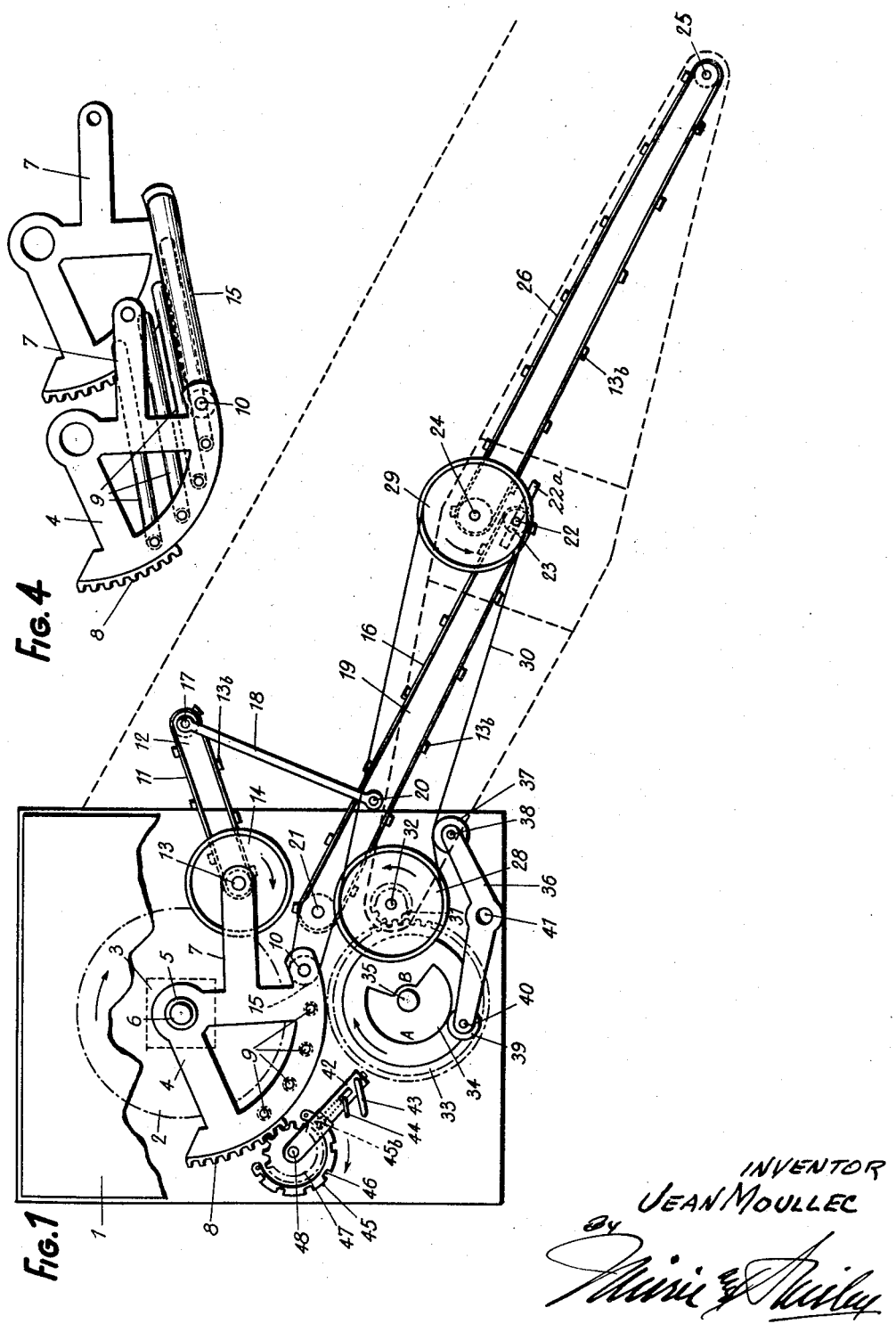

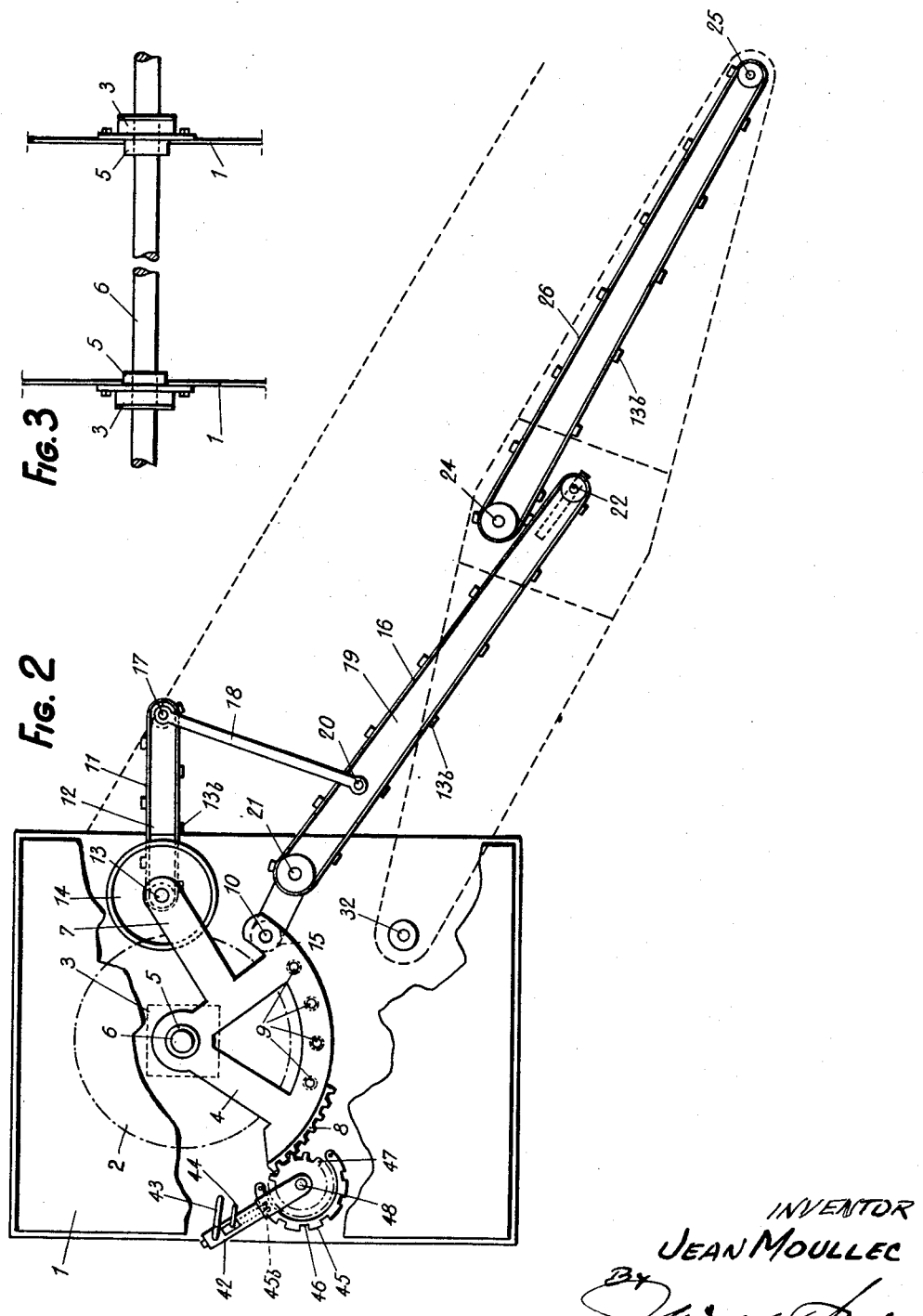

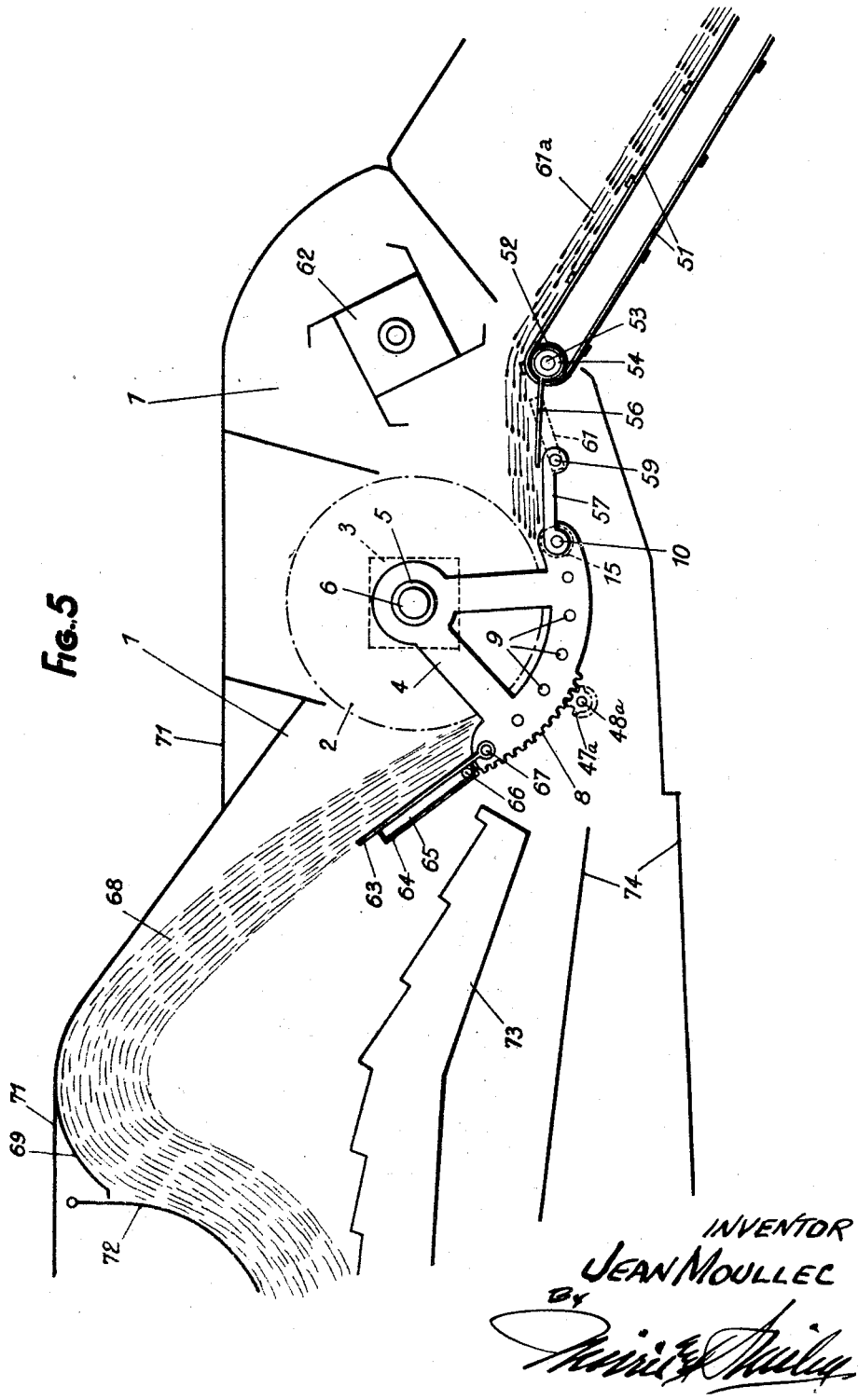

United States Patent Office 2,867,218
Patented Jan. 6, 1959

2,867,218

THRESHER HAVING ANGULARLY ADJUSTABLE CONCAVE

Jean Moullec, Penhars-Quimper, France

Application February 17, 1955, Serial No. 488,885

Claims priority, application France February 26, 1954

5 Claims. (Cl. 130—27)

The present invention relates to the harvester threshers and similar machines comprising a rotary threshing cylinder and into which the crops are fed lengthwise, perpendicularly to the threshing cylinder.

In the known harvester threshers, the crops are fed automatically to the threshing cylinder, in a continuous line in which the stalks of the crop overlap and are nested together, which necessitates the use of a feeding drum and of an evacuating drum. As the rotation of the threshing cylinder is faster than that of the feeding drum, the straw is torn and slashed during its passage between the threshing cylinder and the concave, so that the husk and the straw are too finely divided. This constitutes a drawback which reduces the output of the machine and impairs the cleaning of the grains. Another complication arises from the fact that fragile crops must be fed under the threshing cylinder nearly tangentially to the latter, while crops which are hard to tread out should be fed nearly perpendicularly to the threshing cylinder.

The present invention relates to a new arrangement of the concave which obviates the above-mentioned drawbacks.

According to the invention, the concave is angularly adjustable about the axis of rotation of the threshing cylinder.

To this effect and according to an embodiment of the invention, the concave comprises two side plates which are pivotally mounted on the ends of the shaft of the threshing cylinder, and at least one of said side plates carries a toothed sector meshing with a toothed wheel which can be rotated manually and is preferably provided with a locking device.

According to one embodiment of the invention, the upper end of the crop elevator band is hingedly connected to the sill of the angularly adjustable concave, the arrangement being preferably such that when the concave is in its lowermost position, said elevator band is substantially tangent to the threshing cylinder, and when the concave is in its uppermost position, said elevator band is substantially perpendicular to the threshing cylinder.

Due to this arrangement, the interval between the threshing cylinder and the concave remains constant, and any desired intermediate adjustment between said lowermost and uppermost positions can be effected with precision.

According to another feature of the invention there is provided a crop feeding belt whose driving roller is supported by the side plates of the concave and whose opposite end roller is mounted on a shaft carried by two links which are connected to the frame of the elevator band.

The invention also includes a particular arrangement of the elevator band due to which the crops are fed under the threshing cylinder in a layer whose thickness varies periodically, whereby the absorption of said crops is facilitated. To this effect, the elevator band is divided into two sections, namely an upper section which is hingedly connected to the concave and is driven so as to effect a continuous upward movement at constant speed, and a lower section which feeds said upper section and is driven intermittently.

The intermittent drive of the lower section of the elevator band may be derived, for example, from the driving pulley of the elevator band, by means of a cam which periodically actuates a belt tensioning device.

According to another embodiment of the invention, the upper section of the elevator band is connected to the sill of the angularly adjustable concave by means of a set of two plates which are adapted to slide flat on each other.

According to a particular arrangement, one of said plates is hingedly connected to the shaft of the upper roller of the elevator band and rests on the other plate, one end of which is hingedly connected to the sill of the concave, while the opposite end of said other plate is provided with guiding members which slide in slots formed in the side plates of the machine frame.

Said slots are preferably formed and directed in such manner that the plane of said other plate passes substantially through the axis of the upper roller of the elevator band, in any angular position of the concave.

According to another feature of the invention, a sliding outlet plate is hingedly connected to the outlet end of the concave, the arrangement being such that the direction of said outlet plate remains substantially unchanged when the angular position of said concave is varied.

According to still another feature, a curved straw arresting plate is mounted inside the hood of the machine and extends across the same, behind said outlet plate.

In order to arrest the grains of cereals mixed with the straw, a screen of preferably pliable material, for example of canvas, may be suspended in the machine, behind said straw arresting screen.

The invention will now be described with reference to the appended drawings which represent by way of example two embodiments thereof.

Fig. 1 is a diagrammatic side view of part of a harvester thresher according to one embodiment of the invention, the concave being adjusted in its lowermost position.

Fig. 2 is a view similar to Fig. 1, with the concave adjusted in its uppermost position.

Fig. 3 is a diagrammatic detail front view showing the bearings which support the shaft of the threshing cylinder.

Fig. 4 is a perspective view of the concave alone.

Fig. 5 is a diagrammatic side view of part of a harvester thresher according to another embodiment of the invention, the concave being adjusted in its lowermost position.

Fig. 6 is a view similar to Fig. 5, with the concave adjusted in its uppermost position.

Reference is made first to the embodiment shown in Figs. 1 to 4. Each side plate 1 of the machine frame carries a bearing 3 (see also Fig. 3) having an inwardly directed extension 5. The bearings 3 support a shaft 6 which carries the threshing cylinder 2.

The threshing cylinder 2 operates in conjunction with a concave comprising essentially two side plates 4 carrying concave members 9 of any convenient design and a roller 15 (see also Fig. 4) which forms the sill of the concave. The upper portions of the side plates 4 have openings by which they are rotatably suspended on the aforesaid extensions 5 of the bearings 3. Due to this arrangement, the concave can be adjusted in various angular positions about the shaft 6, the distance between the threshing cylinder 2 and the concave members 9 remaining rigorously constant.

In view of the angular adjustment of the concave at least one side plate 4 of the same is provided with a toothed sector 8 meshing with a toothed wheel 47 mounted on a pin 48 carried by the frame plate 1. The toothed wheel 47 can be rotated by means of a hollow rod 42 provided with a handle 43 and a finger piece 44 secured to a bolt 45b which slides in the hollow rod 42 and is urged by a spring against the notches 46 of a fixed toothed sector 45.

The two side plates 4 of the concave also comprise arms 7 supporting a shaft 13 which carries the driving pulley 14 and one roller of a feeding belt 11. The opposite end roller of this feeding belt is carried by a shaft 17 which is mounted in the side plates 12 of the feeding belt 11 and is supported by the upper ends of two links 18, the lower ends of which are hingedly connected to pins 20 provided on the side plates 19 of a crop elevator band 16. The main frame of the elevator, which is represented in dotted lines, is hingedly connected at its upper end to a shaft 32 carried by the side plates 1 of the machine frame, and said main frame is formed with two lateral slots 22a for the sliding engagement of the ends of a shaft 22 which carries the lower supporting roller 23 of an upper elevator band 16. The frame of this band 16 is formed by the plates 19 which are traversed at their lower parts by the shaft 22, and at their upper parts by a shaft 21 which carries the upper, driving roller of the elevator band 16. The upper parts of the side plates 19 of the upper elevator band 16 are further traversed by the shaft 10 of the sill roller 15 of the concave. Thus, the side plates 19 of the upper elevator band 16 are supported on the one hand by the concave, and on the other hand by the shaft 22 which slides in the aforesaid slots 22a of the main elevator frame. A second, lower elevator band 26 is supported in the main elevator frame by means of two rollers mounted respectively on the shafts 24 and 25. The arrangement is such that the upper end of the lower elevator band 26 overhangs the lower end of the upper elevator band 16.

The band 16 is driven continuously, at constant speed, for example by a pulley keyed on the shaft 21, while the band 26 is driven intermittently. This intermittent drive may be obtained by the following mechanism: A pulley 29 is keyed on the shaft 24, a driving pulley 28 is mounted on the driving shaft 32, and a driving belt 30 passes over the pulleys 28 and 29. A tensioning roller 37 is carried by a pin 38 mounted on a lever 36 which is pivotally mounted on an axis 41 secured to the machine frame 1. On a further pin 40 carried by the lever 36 is rotatably mounted a roller 39 which engages a cam 34. This cam 34 is rigid with a toothed wheel 33 mounted on a shaft 35 and meshing with a toothed wheel 31 keyed on the aforesaid driving shaft 32 carrying the driving pulley 28. The cam 34 comprises a portion A which pushes the roller 39 back so as to tension the belt 30 by the roller 37, and a cut out portion B which leaves the roller 39 free, so that the belt 30 is released to a point where it slips without driving the lower elevator band 26.

13b are small wooden rods provided on the elevator bands 16 and 26, as well as on the feeding belt 11, in order to facilitate the feed of the crops.

The machine which has thus been described operates as follows:

When the concave 9 occupies the position shown in Fig. 1, the elevator band 16 arrives nearly tangentially at the sill 15 of the concave and at the threshing cylinder 2, whereas in the position of Fig. 2 the elevator band 16 arrives nearly perpendicularly at the threshing cylinder 2. Between these extreme positions of the concave, the latter may be adjusted to any intermediate position, by actuating the handle 43 which is then locked, by means of the bolt 45b, in the notch 46 which corresponds to the desired angular position of the concave. The elevator band 16, whose side plates 19 are connected to the concave, follows the movements of the latter when its adjustment is modified, while the lower shaft 22 of the said elevator band slides in the corresponding slots 22a of the main elevator frame.

Due to this novel arrangement, the angular position of the sill 15 of the concave can be precisely adjusted, and any kind of crop harvested by the harvester thresher can be passed through the machine without the straw being slashed. Thus, very dry and fragile or very moist crops can be treated with the required very flat sill, while resistant crops, which are very hard to tread out, are treated with the sill adjusted at a right angle, and intermediate crops are treated with intermediate angular adjustments of the concave.

The lower elevator band 26 being driven intermittently, as described above, the thickness of the layer of crops deposited by said lower elevator band upon the upper elevator band 16 is irregular, which facilitates the absorption of the crops by the threshing cylinder.

Reference will now be made to the second embodiment which is shown in Figs. 5 and 6, wherein similar parts have been designated by the same references as in Figs. 1 to 4.

In the embodiment of Figs. 5 and 6, the arrangement of the threshing cylinder 2 and of the concave comprising the parts 4, 9 and 15 is similar to that of Figs. 1 to 4. The device for adjusting the angular position of the concave by means of the toothed sector 8 is also similar to that described with reference to Figs. 1 and 2. Preferably, toothed sectors 8 and toothed wheels 47a meshing therewith are provided on both sides of the machine. The toothed wheels 47a, being of smaller diameter, the pin 48a on which they are keyed will have to be rotated through more than 360° in order to impart its full range of angular displacement to the concave, so that the toothed sector 45 formed with the locking notches (see Figs. 1 and 2) must be extended to cover a complete circumference.

An elevator band 51 is driven by a transverse roller 52 whose shaft 53 is supported at both ends in bearings 54 mounted in the side plates 1 of the machine frame. A movable inlet guide is formed by two plates 56 and 57 of sheet metal which are adapted to slide flat on each other. The plate 56, which extends across the thresher, has its front edge hingedly mounted on the bearings 54. The plate 57, which also extends across the beater, has its rear edge hingedly connected to the shaft of the sill roller 15 of the concave, while its front edge is supported by a transverse shaft 59 whose ends are slidably engaged into slots 61 formed in the side plates 1 of the machine frame. The rear part of the plate 56 rests flat on the front part of the plate 57 and can slide thereon when the angular position of the concave is changed, so that the plates 56 and 57 always form a continuous, plane surface between the upper end of the elevator 51 and the inlet of the concave, which surface constitutes the most favorable guide for the crops 61a to be fed to the threshing cylinder 2, irrespective of the angular adjustment of the concave sill 15 with respect to the threshing cylinder shaft 6. A feeding drum 62 of known construction assists the feeding of the crops to the threshing cylinder.

An outlet plate 63 extending across the rear end of the concave is provided on each of its side edges with a bracket 64 formed with a slot 65 in which passes a transverse rod 66 extending between the side plates 1 of the machine frame. The lower edge of the plate 63 is hingedly connected to pins 67 provided on the side plates 4 of the concave. The plate 63 guides the straw 68 which is thrown out by the threshing cylinder 2, so that the straw is projected upwards, against a curved arresting plate 69 mounted in and extending across the hood 71. A screen 72, preferably of canvas, is suspended in the harvester thresher so as to arrest the cereal grains mixed with the straw.

At 73 is represented one of the usual rocking members, and 74 are the grain return and grain collecting tables.

The operation of this second embodiment is similar to that of the embodiment of Figs. 1 to 4. When the concave is in the position shown in Fig. 5, the inlet plates 56 and 57 are placed substantially tangentially with respect to the threshing cylinder 2, so that the crops 61a are fed substantially tangentially to the concave sill 15, whereas in the position shown in Fig. 6 the plates 56 and 57, and consequently also the feed of the crops 61a, are nearly perpendicular to the threshing cylinder 2. Between these two extreme positions of the concave, the latter can be adjusted so as to assume any desired intermediate position, by means of the described adjusting device. The described arrangement ensures automatically the sliding movements of the inlet plates 56, 57 and of the outlet plate 63, which are controlled by the side plates 4 of the concave, during the angular adjustments of the latter. The disposition of the outlet plate 63 is such that its direction remains practically unaffected by the angular displacements of the concave. Thus, the straw 68 is always thrown in the same direction, and then falls on the rocking members 73.

It will be understood that the invention is not limited to the embodiments which have been described and shown, but covers also any modifications thereof, within the scope of the appended claims.

I claim:

1. A threshing machine comprising a frame, a shaft supported by said frame, a threshing cylinder rotatably supported by said shaft, a concave mounted for angular adjustment about said shaft in relation to the threshing cylinder, said concave extending only over a limited arc about the cylinder, a sill attached to one end of the concave, means for feeding crops transversely over said sill between the concave and the threshing cylinder, means for adjustably positioning the concave in relation to the threshing cylinder prior to the operation of the machine, and means for retaining said concave stationary in relation to the cylinder during the operation of the machine, said crop feeding means including an elevator having an upper section adjacent to said sill and a pair of slidable plates forming a bridge between said upper elevator section and said sill, one of said plates having its front edge hingedly connected to said upper elevator section and the other of said plates having its rear edge hingedly connected to the sill and its front edge resting upon said first mentioned plate.

2. A threshing machine as set forth in claim 1 including slidable supporting means for the front edge of the other of said plates, said means being so positioned in relation to the elevator and threshing cylinder that both plates lie substantially in a plane passing through the upper end of the elevator for any angular position of said concave.

3. In a threshing machine, a frame, a shaft supported by said frame, a rotary threshing cylinder supported by said shaft, a concave beneath said cylinder, side plates supporting said concave, said plates being mounted for rotary angular displacement about said shaft relative to said cylinder, a toothed sector mounted on one of said side plates, a rotatable toothed wheel mounted on the frame and meshing with said toothed sector, and manually operated means for rotating said toothed wheel and for locking said wheel in any desired position in relation to said toothed sector.

4. A threshing machine as set forth in claim 3, wherein each side of the frame is provided with a bearing supporting said shaft, an inwardly directed extension on each bearing, said side plates being rotatably suspended on said extensions.

5. A threshing machine as set forth in claim 4, including a pin carried by the frame for mounting said toothed wheel, and the manually operated means for rotating the toothed wheel comprise a hollow rod provided with a handle and a finger piece secured to a bolt which slides in said hollow rod and spring means urging said bolt against notches of a fixed toothed sector.

References Cited in the file of this patent

UNITED STATES PATENTS

| | | |
|---|---|---|
| 257,753 | Phillips | May 9, 1882 |
| 520,725 | Broatch | May 29, 1894 |
| 750,902 | Shelton et al. | Feb. 2, 1904 |
| 1,138,835 | Bergren | May 11, 1915 |
| 1,222,730 | Bunting | Apr. 17, 1917 |
| 1,238,102 | Cahall | Aug. 28, 1917 |
| 2,262,453 | Dray | Nov. 11, 1941 |
| 2,633,852 | Lupton | Apr. 7, 1953 |